UNITED STATES PATENT OFFICE.

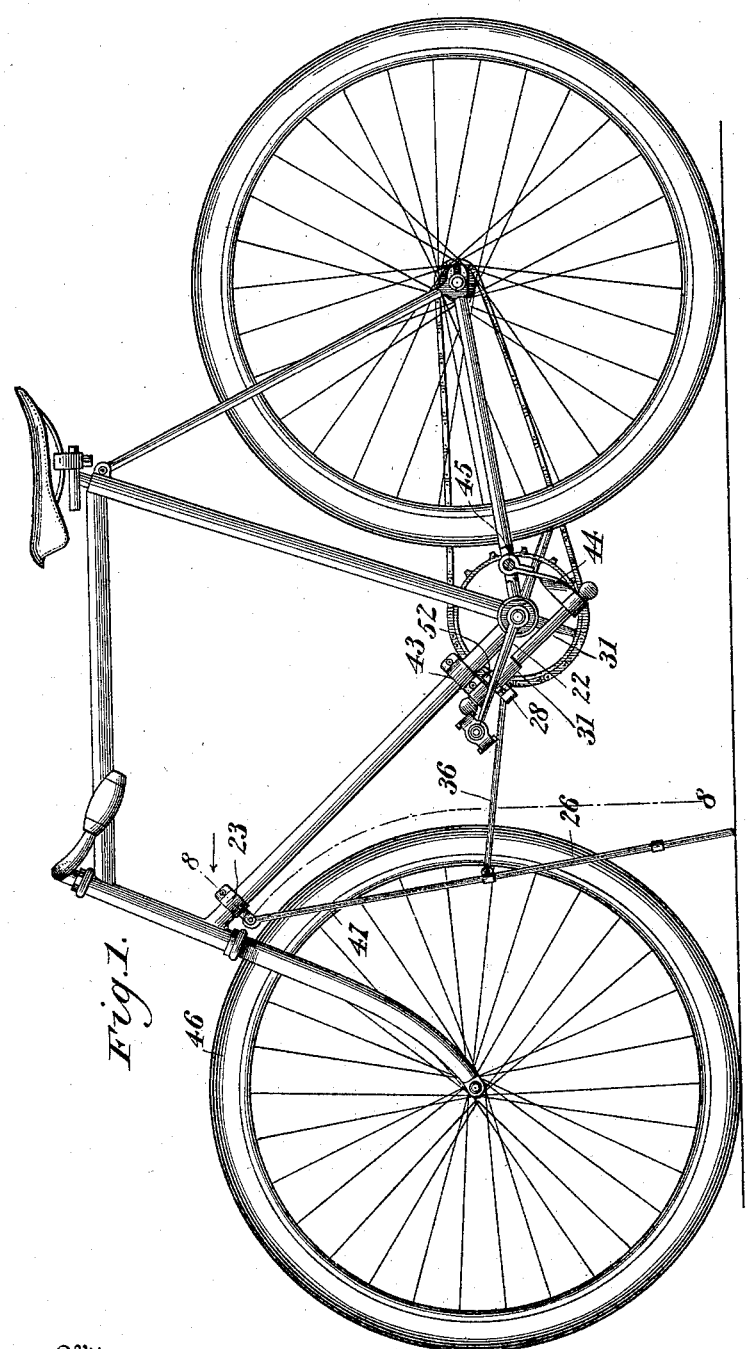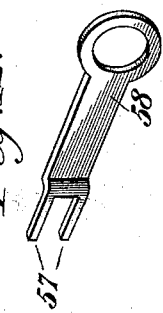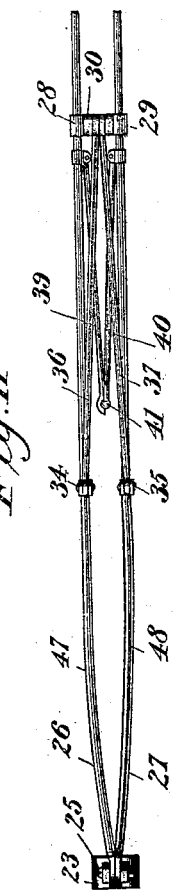

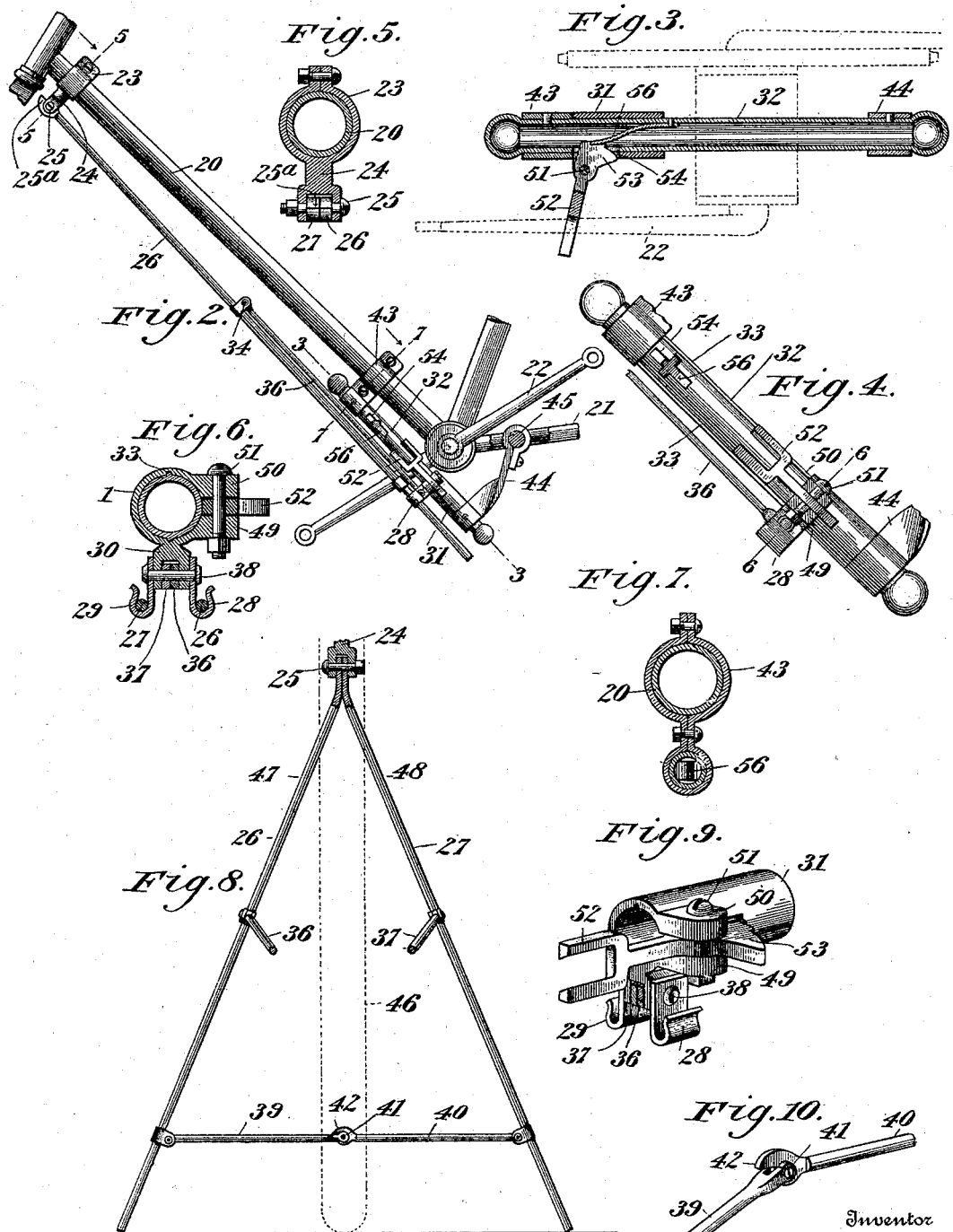

JOHN P. HOPPERT, OF BALTIMORE, MARYLAND.

BICYCLE SUPPORT AND LOCK.

SPECIFICATION forming part of Letters Patent No. 638,121, dated November 28, 1899.

Application filed May 21, 1898. Serial No. 681,342. (No model.)

*To all whom it may concern:*

Be it known that I, JOHN P. HOPPERT, residing at Baltimore, in the State of Maryland, have invented a new and useful Combination Bicycle Support and Lock, of which the following is a specification.

My invention is in the nature of a support and lock for bicycles, the object being to provide an attachment for bicycles of ordinary construction, wherewith the bicycle may be supported in a vertical position and the crank locked against moving, thus obviating the necessity of bicycle racks and locks.

With this object in view my invention consists in an attachment provided with means for clamping or securing it to the frame of the bicycle, comprising pivotal legs or rods, means for folding them against the frame or extending them into operative position, and a lock to secure the crank-arms against movement connected to the means for extending the supporting legs or rods.

My invention further consists in the specific improvements in the construction, arrangement, and combinations of parts, as fully described hereinafter, and afterward particularly pointed out in the claims.

In order to enable others skilled in the art to which my invention most nearly appertains to make and use the same, I will now proceed to describe its construction and operation, reference being had to the accompanying drawings, forming part of this specification, in which—

Figure 1 is a view in side elevation of a bicycle equipped with my invention, with the supporting-legs extended and the crank-arms locked against movement. Fig. 2 is a fragmentary detail view, in side elevation, on a larger scale, of parts of the bicycle, showing the attachment secured thereto, with the supporting-legs folded against the frame and the crank-arms unlocked. Fig. 3 is a detail longitudinal sectional view on the line 3 3 of Fig. 2. Fig. 4 is a detail view, in side elevation, on a still larger scale, of some of the parts shown in Fig. 2. Fig. 5 is a transverse sectional view on the line 5 5 of Fig. 2. Fig. 6 is a similar view on the line 6 6 of Fig. 4. Fig. 7 is a similar view on the line 6 6 of Fig. 2. Fig. 8 is a sectional view on the line 8 8 of Fig. 1 looking toward the front, with the wheel shown in dotted lines. Fig. 9 is a detail perspective view illustrating the mechanism for supporting the legs and locking the crank-arms. Fig. 10 is a detail perspective view illustrating the joint of the rods which connect the supporting-legs near their outer ends. Fig. 11 is a bottom plan view of the support folded and detached from the frame. Fig. 12 is a detail perspective view of the key for unlocking the crank-arms.

Like numerals of reference mark the same parts wherever they occur in the various figures of the drawings.

Inasmuch as my improved support and lock may be applied to the ordinary bicycle and is so illustrated in the drawings, only those parts of the bicycle having special connection with or relation to my attachment will be designated by numerals, of which 20 indicates the front brace, 21 the rear forks, and 22 the left crank or pedal-arm.

23 indicates a clamp rigidly secured near the forward upper end of the front brace 20, from which projects on the under side of the brace a pin 24, in which is pivotally connected, by means of a screw 25, a pair of legs or supports 26 and 27, whose normal position when free from any restraint is at an angle of about fifty degrees (50°) from each other. These legs or supports are made of elastic metal, so that their outer ends may be brought nearer together, as illustrated in Fig. 11, in which position they are held when not in use in spring-clamps 28 and 29, secured to a bifurcated lug 30, projecting laterally from a clamp 31, mounted to slide upon a tube 32 and prevented from turning by means of splines or ribs 33 on the outside of the tube, which fits in corresponding grooves in the inner surface of the clamp.

Pivotally secured to the legs or supports at about their mid-length, as at 34 and 35, are rods 36 and 37, which act as stretchers after the manner of stretchers of an umbrella, their opposite ends being pivotally secured in the bifurcated lug 30, before referred to, by means of the bolt or rivet 38, which secures the spring-clamps 28 and 29 in position. The legs or supports 26 and 27 are connected together by rods 39 and 40, which are connected to each other at their opposite ends by means of a joint 41, which prevents movement beyond the horizontal line, as shown in Fig. 8, a projecting stop 42 on the rod 39 coming into contact with the rod 40 when they reach this horizontal position.

As before stated, the clamp 31 is slidable upon the tube 32, and the tube 32 being fixed in position by means of a clamp 43, which secures it to the front brace 20, and a clamp 44, which secures it to the cross-bar 45, which connects the rear fork 21, when the clamp 31 is moved upon the tube 32 it will act in the capacity of the runner of an umbrella and cause the stretchers 36 and 37 to spread the outer legs or supports 26 and 27 from the position shown in Figs. 2 and 11 to that shown in Figs. 1 and 8, the outer movement of the legs being limited by the connecting-rods 39 and 40. When the legs or supports are in their folded position, as shown in Figs. 2 and 11, they will in no wise interfere with the movement of the wheel, and when they are spread to the position shown in Figs. 1 and 8, they will rest upon the ground upon each side of the rear edge of the front wheel 46, their upper portions at about 47 and 48 resting quite close to or perhaps against the tire, thus preventing any movement laterally of the front or steering wheel and securely supporting the bicycle in an upright position, the connecting-rods 39 and 40 in their horizontal position in line with each other acting as braces to prevent their being moved either farther apart or nearer together.

The clamp 31, before referred to, is provided with perforated ends or branches 49 and 50, between which is pivotally secured, by means of a bolt 51, a forked lever 52, the inner end of which is constructed as a toothed dog 53. When this clamp 31, which, as before stated, slides upon the tube 32 after the manner of an umbrella-runner, is at the lower end of the tube 32, the forked lever 52 will lie parallel with the tube 32, as shown in Figs. 2, 4, and 9, and cannot be turned out of said position on account of the contact of the dog 53 with the surface of the tube 32; but when the clamp is moved to the outer end of the tube 32, in which position the legs are extended, the dog will register with a cruciformed slot 54 in the tube 32, which will permit the dog to be turned outward at about a right angle to the tube 32, as best shown in Fig. 3, in which position its forked ends will embrace the crank-arm 22 and prevent its being moved, and consequently preventing the turning of the crank-shaft and locking the wheel in a stationary position. In its locking position the teeth of the dog 53 are engaged by a spring 56, secured on the inside of the tube, which bears against the dog projecting through the slot 54. In this position the dog fills the slot 54, except the extremities of its horizontal branch, so that when it is desired to unlock the spring 56 from engagement with the dog to permit the dog to be thrown into its unlocked position parallel with the tube 32 the prongs 57 of the key 58 (see Fig. 12) may be straddled over the dog and entered into said open extremities, when by pressing inward the spring will be released from the teeth of the dog, leaving it free to be turned. When the legs 26 and 27 are in their operative position as supports, they will be prevented from any further forward movement on their pivot 25 by means of the stop $25^a$, formed as parts of the legs and projecting upward beyond the pivot. To apply it to any ordinary bicycle, it is only necessary to secure the tube 32, with its attachment, in position parallel to the front brace 20 by means of the clamps 43 and 44 and to secure the legs pivotally to the upper end of the brace 20 by means of the clamp 23, which operations can be performed very quickly and, inasmuch as the parts of the attachment which contact with the frame of the machine are all stationary, there will no injury done to the enamel of the frame by the use of the attachment. The parts having been secured in position by the three clamps and the legs 26 and 27 being folded, as especially shown in Fig. 2, the only act necessary to spread them into their supporting position, as shown in Figs. 1 and 8, will be to slide the clamp 31 from the lower end of the tube 32 to its upper end. During this movement the clamp acts exactly as does the runner of an umbrella, the rods 36 and 37 acting as stretchers and the supporting-legs as the ribs of an umbrella, the tube 32 taking the place of the handle. Before sliding the crank, however, it will be necessary to lift the lower ends of the supports 26 and 27 out of the spring-clamps 28 and 29, which can readily be done, and when this is accomplished the elasticity of the supporting-legs will carry them from the position shown in Fig. 11 to that shown in Fig. 8, in which position they will be spread a proper distance apart, limited by the connecting-rods 39 and 40, to straddle the rear edge of the front wheel and rest upon the ground, thus preventing any lateral movement of the frame of the machine and firmly supporting it in an upright position, with the front wheel in line with the rear wheel and held there by the legs. After spreading the legs 26 and 27 and moving them into their supporting position the wheel is properly supported, as before described; but the wheels are not locked. This is accomplished by means of the forked lever 52, its dog 53, and the spring 56, as described in detail hereinbefore.

The whole attachment is neat and occupies very little room upon the wheel, interfering in no way with its running. Its parts are so small that it can be constructed very cheaply, and any person able to use a screw-driver and wrench can apply it to a bicycle.

While I have illustrated and described what I consider to be efficient means for carrying out my invention, I do not wish to be understood as restricting myself to the exact details of construction shown and described, but hold that any slight changes or variations such as might suggest themselves to the ordinary mechanic would properly fall within the limit and scope of my invention.

Having thus fully described my invention, what I claim as new, and desire to secure by Letters Patent, is—

1. The combination with a bicycle, of a stationary clamp secured to the front brace near its upper end, of a pair of elastic supports pivotally secured in said clamp and provided with stops beyond the pivots, a supplementary tube secured to the frame parallel to the front brace and adjacent to the crank-hanger, a cylindrical runner-clamp sleeved thereon, and stretcher-rods pivotally secured to the supporting-legs and to the runner-clamp, substantially as described.

2. The combination with the frame of a bicycle, of a clamp rigidly secured to the front brace near its upper end, a pair of supporting-legs pivotally secured to the clamp and extended to form a stop, a supplemental tube secured to the front brace and rear fork in a position below and parallel with the front brace, a runner-clamp adapted to slide but fixed against rotation on said supplemental tube, stretchers pivotally connected at one of their ends to the runner-clamp and at their opposite ends to the supporting-legs, and hooked clamps secured to the runner-clamps to hold the supporting-legs in position parallel with the front brace, substantially as described.

3. The combination in a bicycle, of a supplementary tube secured below and parallel with the front brace, of a clamp on the front brace near its upper end, legs pivoted to the clamp and formed with projecting stops, a runner-clamp slidably but non-rotatably mounted upon the supplementary tube, stretchers pivotally connecting the runner-clamp with the legs, spring-hooked clamps secured to the runner-clamp, adapted to hold the legs in a folded position parallel to the front brace, and a forked lever pivoted to the runner-clamp and adapted to engage and lock one of the crank-arms, substantially as described.

4. The combination with the frame of a bicycle, of a stationary clamp secured to the front brace near its upper end, of a pair of elastic supports pivotally secured in said clamp and provided with stops beyond the pivots, of a tube secured below and parallel with the front brace and provided with a slot, a runner on said tube carrying lateral lugs, a lever pivoted in said lugs, in line with said slot, having one end bifurcated and the other end formed into a toothed dog adapted to turn into said slot, and a spring in the tube adapted to engage the teeth of the dog, substantially as described.

JOHN P. HOPPERT.

Witnesses:
SAMUEL P. PIERCY,
ANDREW J. PRELLER.